US012669650B2

(12) United States Patent
Fukuhara et al.

(10) Patent No.: US 12,669,650 B2
(45) Date of Patent: Jun. 30, 2026

(54) OPTICAL WAVEGUIDE DEVICE AND METHOD OF MAKING THE SAME

(71) Applicant: SHINKO ELECTRIC INDUSTRIES CO., LTD., Nagano (JP)

(72) Inventors: Motoyuki Fukuhara, Nagano (JP); Hisashi Kaneda, Nagano (JP); Kazunao Yamamoto, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 316 days.

(21) Appl. No.: 18/643,258

(22) Filed: Apr. 23, 2024

(65) Prior Publication Data

US 2024/0361518 A1     Oct. 31, 2024

(30) Foreign Application Priority Data

Apr. 25, 2023    (JP) ................................. 2023-071858

(51) Int. Cl.
| | |
|---|---|
| *G02B 6/12* | (2006.01) |
| *G02B 6/122* | (2006.01) |
| *G02B 6/24* | (2006.01) |
| *G02B 6/26* | (2006.01) |

(52) U.S. Cl.
CPC ................. *G02B 6/24* (2013.01); *G02B 6/12* (2013.01); *G02B 6/122* (2013.01); *G02B 6/26* (2013.01); *G02B 6/12004* (2013.01); *G02B 2006/12061* (2013.01); *G02B 6/1223* (2013.01)

(58) Field of Classification Search
CPC .. G02B 6/12004; G02B 6/122; G02B 6/1223; G02B 6/24; G02B 6/26
See application file for complete search history.

(56) References Cited

U.S. PATENT DOCUMENTS

| | | | | |
|---|---|---|---|---|
| 2003/0113054 A1* | 6/2003 | Furuyama | ........... | H10W 72/851 |
| | | | | 385/91 |
| 2004/0057667 A1* | 3/2004 | Yamada | ................. | G02B 6/305 |
| | | | | 385/50 |
| 2005/0123244 A1* | 6/2005 | Block | .................. | G02B 6/1221 |
| | | | | 385/39 |
| 2010/0054663 A1* | 3/2010 | Okayama | ............. | G02B 6/1228 |
| | | | | 216/41 |

(Continued)

FOREIGN PATENT DOCUMENTS

| | | | |
|---|---|---|---|
| JP | 2018-141910 A | * | 9/2018 |
| JP | 2018-200333 | | 12/2018 |

*Primary Examiner* — Michael Stahl

(74) *Attorney, Agent, or Firm* — IPUSA, PLLC

(57) ABSTRACT

An optical waveguide device includes an optical waveguide substrate including a first cladding layer disposed on a support, a core layer disposed on the first cladding layer, and a second cladding layer selectively covering the core layer, and a silicon photonic chip including a silicon substrate and a silicon waveguide disposed on one side of the silicon substrate, wherein part or all of a thickness of one end of the silicon waveguide is embedded in the core layer exposed from the second cladding layer, wherein a thickness of the core layer in a place covered with the silicon substrate is less than that of the core layer in a place not covered with the silicon substrate, and wherein a width of the core layer at a point of contact with the silicon substrate is wider than that of the core layer in a place covered with the second cladding layer.

6 Claims, 9 Drawing Sheets

(56)     References Cited

U.S. PATENT DOCUMENTS

| | | | | |
|---|---|---|---|---|
| 2013/0156370 A1* | 6/2013 | Kim | ....................... | G02B 6/305 |
| | | | | 385/14 |
| 2014/0112616 A1* | 4/2014 | Numata | ................ | G02B 6/132 |
| | | | | 385/14 |
| 2014/0334781 A1* | 11/2014 | Fiorentino | .......... | G02B 6/3855 |
| | | | | 29/428 |
| 2015/0117818 A1* | 4/2015 | Matsumoto | ............ | G02B 6/305 |
| | | | | 385/43 |
| 2018/0341063 A1 | 11/2018 | Yamamoto | | |
| 2019/0025519 A1* | 1/2019 | Okada | ....................... | G02B 6/30 |
| 2019/0265415 A1* | 8/2019 | Psaila | ............... | G02B 6/29331 |
| 2019/0391325 A1* | 12/2019 | Iida | ......................... | G02B 6/32 |
| 2024/0329305 A1* | 10/2024 | Yamamoto | ............ | G02B 6/122 |

\* cited by examiner

OPTICAL WAVEGUIDE DEVICE AND METHOD OF MAKING THE SAME

CROSS-REFERENCE TO RELATED APPLICATIONS

The present application is based on and claims priority to Japanese Patent Application No. 2023-071858 filed on Apr. 25, 2023, with the Japanese Patent Office, the entire contents of which are incorporated herein by reference.

FIELD

The disclosures herein relate to optical waveguide devices and methods of making the optical waveguide devices.

BACKGROUND

An optical waveguide device having silicon photonic chips and optical waveguides is used to transmit and receive signals in a data center or the like where various computers and data communication apparatuses are installed. In such an optical waveguide device, the core layer of an optical waveguide and the silicon waveguide of a silicon photonic chip are optically coupled to each other.

In the optical waveguide device as described above, it is difficult to align the core layer of the optical waveguide with the silicon waveguide of the silicon photonic chip, which may result in the failure to achieve a sufficient positional accuracy.

There may be a need to provide an optical waveguide device having excellent positional accuracy between the silicon waveguide and the core layer.

PRIOR ART LITERATURE

Patent Documents

[Patent document 1] U.S. Pat. No. 6,909,637

SUMMARY

According to an aspect of the embodiment, an optical waveguide device includes an optical waveguide substrate including a support, a first cladding layer disposed on the support, a core layer disposed on the first cladding layer, and a second cladding layer selectively covering the core layer, and a silicon photonic chip including a silicon substrate and a silicon waveguide disposed on one side of the silicon substrate, wherein part or all of a thickness of one end of the silicon waveguide in an optical waveguide direction is embedded in the core layer exposed from the second cladding layer, and is optically coupled with the core layer, wherein a thickness of the core layer in a place covered with the silicon substrate in plan view is less than a thickness of the core layer in a place not covered with the silicon substrate in the plan view, and wherein in a direction perpendicular to the optical waveguide direction, a first width of the core layer at a point of contact with the silicon substrate is wider than a second width of the core layer in a place covered with the second cladding layer.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
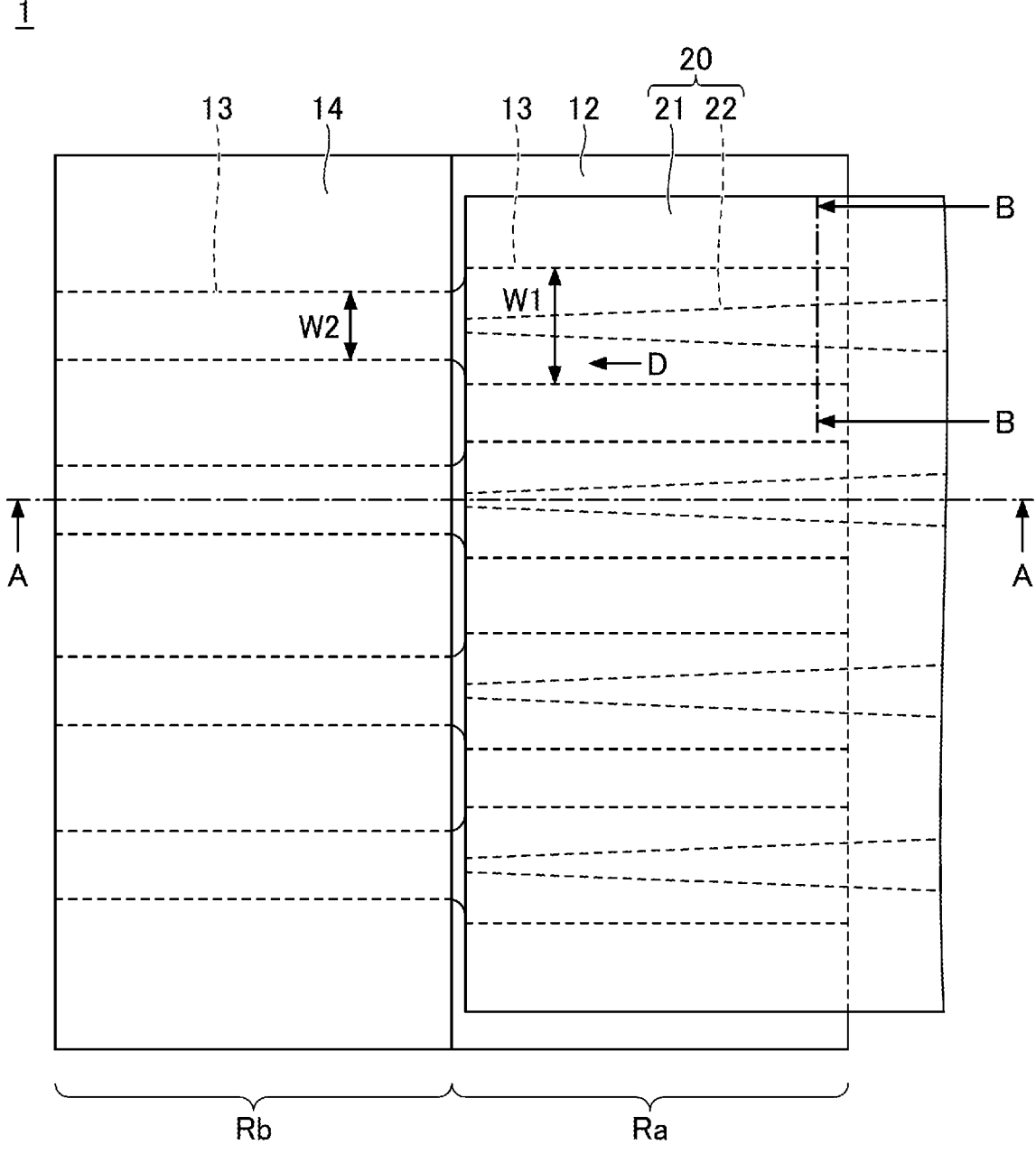
FIG. 1 is a plan view illustrating an example of an optical waveguide device according to a first embodiment.

In the following, embodiments for carrying out the invention will be described with reference to the accompanying drawings. In these drawings, the same elements are referred to by the same reference numerals, and duplicate descriptions thereof may be omitted.

First Embodiment

[Optical Waveguide Device]

Figure 2A:
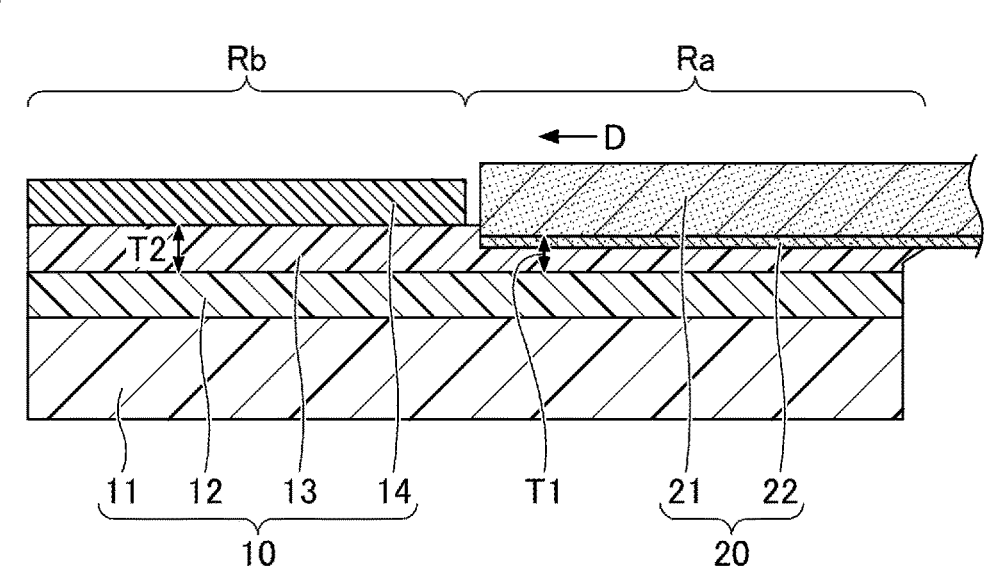
FIGS. 2A and 2B are cross-sectional views illustrating the example of the optical waveguide device according to the first embodiment.
Figure 2B:
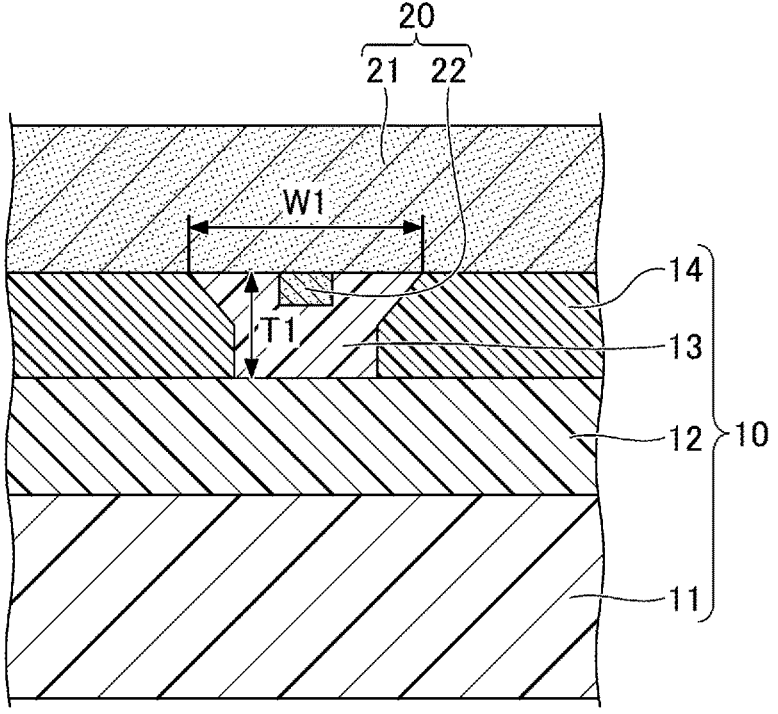

FIG. 1 is a plan view illustrating an example of an optical waveguide device according to a first embodiment. FIGS. 2A and 2B are cross-sectional views s illustrating the example of the optical waveguide device according to the first embodiment. FIG. 2A illustrates a cross-section taken along the line A-A in FIG. 1 and FIG. 2B illustrates a cross-section taken along the line B-B in FIG. 1.

Referring to FIG. 1 and FIGS. 2A and 2B, an optical waveguide device 1 includes an optical waveguide substrate 10 and a silicon photonic chip 20. The optical waveguide substrate 10 includes a support 11, a first cladding layer 12, a core layer 13, and a second cladding layer 14.

The support 11 serves as a base for supporting the first cladding layer 12, the core layer 13, and the second cladding layer 14. The support 11 is formed of, for example, an insulating resin material such as a glass epoxy resin. The support 11 may be a rigid substrate with strong rigidity or a flexible substrate with weak rigidity. The support 11 may alternatively be a glass substrate. While an organic substrate is easily deformed by heat shrinkage, moisture absorption, etc., the use of a glass substrate serves to reduce deformation. The support 11 may alternatively be a silicon substrate or a ceramic substrate. An electrical circuit may be formed on the support 11.

The first cladding layer 12 is disposed on the support 11. The thickness of the first cladding layer 12 may be, for example, about 10 μm to 30 μm. The refractive index of the first cladding layer 12 may be, for example, about 1.5. The first cladding layer 12 may be formed of a photosensitive resin such as a polyimide resin, an acrylic resin, an epoxy resin, a polyolefin resin, a polynorbornene resin or the like.

The core layer 13 is disposed on the first cladding layer 12. The refractive index of the core layer 13 is higher than the refractive index of the first cladding layer 12, and may be, for example, about 1.6. The core layer 13 may be formed of, for example, a material selected as appropriate from the examples listed as the material of the first cladding layer 12.

Although the optical waveguide device 1 is structured to have 4 strips of the core layer 13 arranged side by side at a predetermined interval, the structure may alternatively have a plurality of strips of the core layer 13 arranged side by side at a predetermined interval, or have only one strip of the core layer 13. The strips of the core layer 13 may not be formed in a straight line but may include a curved portion. The spacing between adjacent strips of the core layer 13 may or may not be constant. The second cladding layer 14 is disposed on the first cladding layer 12 and selectively covers the core layer 13. The thickness of the second cladding layer 14 may be, for example, about 10 μm to 30 μm. The refractive index of the second cladding layer 14 may be, for example, about 1.5. The second cladding layer 14 is a cured photosensitive resin. The second cladding layer 14 may be formed, for example, of a material selected as appropriate from the examples listed as the material of the first cladding layer 12.

In the core layer 13, the region not covered with the second cladding layer 14 is referred to as a first region Ra, and the region covered with the second cladding layer 14 is referred to as a second region Rb. The first region Ra may be used as an optical coupling part for establishing optical coupling with the silicon photonic chip 20.

The silicon photonic chip 20 includes a silicon substrate 21 and silicon waveguides 22 provided on one side of the silicon substrate 21. Each of the silicon waveguides 22 is a fine optical waveguide formed in a silicon chip, and is used in the silicon photonic technology for integrating optical circuits and the like in a silicon chip.

The silicon photonic chip 20 is arranged on an optical waveguide substrate 10 with the silicon waveguides 22 facing toward the core layer 13. Part or all of the thickness of each silicon waveguide 22 at one end thereof in the optical waveguide direction D is embedded in a portion of the core layer 13 for optical coupling with the core layer 13, which portion is not covered with the second cladding layer 14. The silicon waveguides 22 and the core layer 13 are adiabatically coupled.

Preferably, the entire thickness of each silicon waveguide 22 at one end thereof in the optical waveguide direction D is embedded in the portion of the core layer 13 that is not covered with the second cladding layer 14. Since light leaking from the silicon waveguide 22 not only exits from the lower surface of the silicon waveguide 22 but also exits from the side surfaces, embedding the entire silicon waveguide 22 in the core layer 13 serves to improve the optical coupling efficiency.

The thickness of the silicon substrate 21 is, for example, about 100 μm to 800 μm. The silicon waveguides 22 may be disposed on, for example, a protective film provided on the silicon substrate 21. The protective film may be formed of, for example, $SiO_2$ or $SiO_x$. The thickness of the protective film is, for example, about 2 μm to 6 μm.

In plan view, one end of each silicon waveguide 22 may be, for example, tapered. That is, in plan view, one end of the silicon waveguide 22 for optically coupling with the core layer 13 may gradually become narrower. Such a shape serves to improve the optical coupling efficiency between the silicon waveguide 22 and the core layer 13. The width of each silicon waveguide 22 is, for example, about 200 nm to 500 nm, except for the tapered part. The width of the tip of the tapered portion is, for example, about ½ to ¼ of the width of the constant-width portion. The thickness of the silicon waveguides 22 is constant. The thickness of the silicon waveguides 22 is, for example, about 20 nm to 300 nm.

The device 1 is optical waveguide configured such that the thickness T1 of the core layer 13 in a region covered with the silicon substrate 21 in plan view is thinner than the thickness T2 of the core layer 13 in a region not covered with the silicon substrate 21 in plan view. The thickness T1 of the core layer 13 may be, for example, 4 μm to 9 μm. The thickness T2 of the core layer 13 may be, for example, 5 μm to 10 μm.

The optical waveguide device 1 is further configured such that in a direction perpendicular to the optical waveguide direction D, the first width W1 of a strip of the core layer 13 at the point of contact with the silicon substrate 21 is wider than the second width W2 of the strip of the core layer in the place covered with the second cladding layer 14. Since the first width W1 is wider than the second width W2, the positioning accuracy required between each silicon waveguide 22 and a corresponding strip of the core layer 13 in the direction perpendicular to the optical waveguide direction D is less stringent, which allows the silicon waveguide 22 to be readily embedded in the core layer 13. This arrangement provides the optical waveguide device 1 having effectively excellent positional accuracy between the silicon waveguides 22 and the core layer 13. This arrangement also serves to increase the contact area between the core layer 13 and the silicon photonic chip 20, thereby improving the adhesion between the core layer 13 and the silicon photonic chip 20.

The second width W2 of the core layer 13 may be, for example, about 5 μm to 10 μm. The first width W1 is preferably 1.05 or more times the second width W2. For example, if the first width W1 is 1.05 times the second width W2, and the second width W2 of the core layer 13 is 5 μm, the first width W1 is 5.25 μm. Since the width of each silicon waveguide 22 is about 0.5 μm or less, the provision of an additional width of 0.25 μm has a sufficient effect on reducing the required positioning accuracy between the silicon waveguide 22 and the core layer 13. The first width W1 is preferably less than or equal to 1.2 times the second width W2. Providing an excessively wide first width W1 may result in the thickness T1 of the core layer 13 being reduced, thereby creating the risk that the core layer 13 fails to function as an optical waveguide. However, the provision of the first width W1 that is less than or equal to 1.2 times the second width W2 ensures a sufficient thickness T1 for the core layer 13 to function as an optical waveguide.

The optical waveguide device 1 may be configured such that a strip of the core layer 13 in the place covered with the silicon substrate 21 in a plan view has a portion whose width, as measured in the direction perpendicular to the optical waveguide direction D, gradually increases with the distance from the support 11 toward the silicon substrate 21. The width of the strip of the core layer 13 in the place covered with the silicon substrate 21 in a plan view as measured in the direction perpendicular to the optical waveguide direction D is preferably the largest at the point closest to the silicon substrate 21. This arrangement allows the first width W1 to be easily widened.

The end of a strip of the core layer 13 located in the place covered with the silicon substrate 21 preferably protrudes in the optical waveguide direction D in a longitudinal cross-section taken along the optical waveguide direction D (see FIG. 2A), such that a portion at the point of contact with the silicon waveguide 22 protrudes relative to a portion at the point of contact with the first cladding layer 12. This arrangement serves to increase the contact area between the core layer 13 and the silicon photonic chip 20, thereby improving the adhesion between the core layer 13 and the silicon photonic chip 20.

It may be noted that in the first region Ra, a resin part covering the side surfaces of strips of the core layer 13 may be provided. The resin part may be made of, for example, a resin material similar to the material of the second cladding layer 14.

The optical waveguide substrate 10 may be coupled to a connector or the like (not shown) at an end face (left-hand-side end face in FIG. 2A) opposite to the side where the silicon waveguides 22 and the core layer 13 are optically coupled. The silicon photonic chip 20 may be coupled to an interconnect substrate (not shown), having a semiconductor device or the like mounted thereon, at an end face (right-hand side in FIG. 2A) opposite to the side where the silicon waveguides 22 and the core layer 13 are optically coupled.

[Method of Making Optical Waveguide Device]

In the following, a method of making the optical waveguide device 1 will be described. FIG. 3 through FIG. 8 illustrate a manufacturing process of the optical waveguide device according to the first embodiment.

Figure 3:
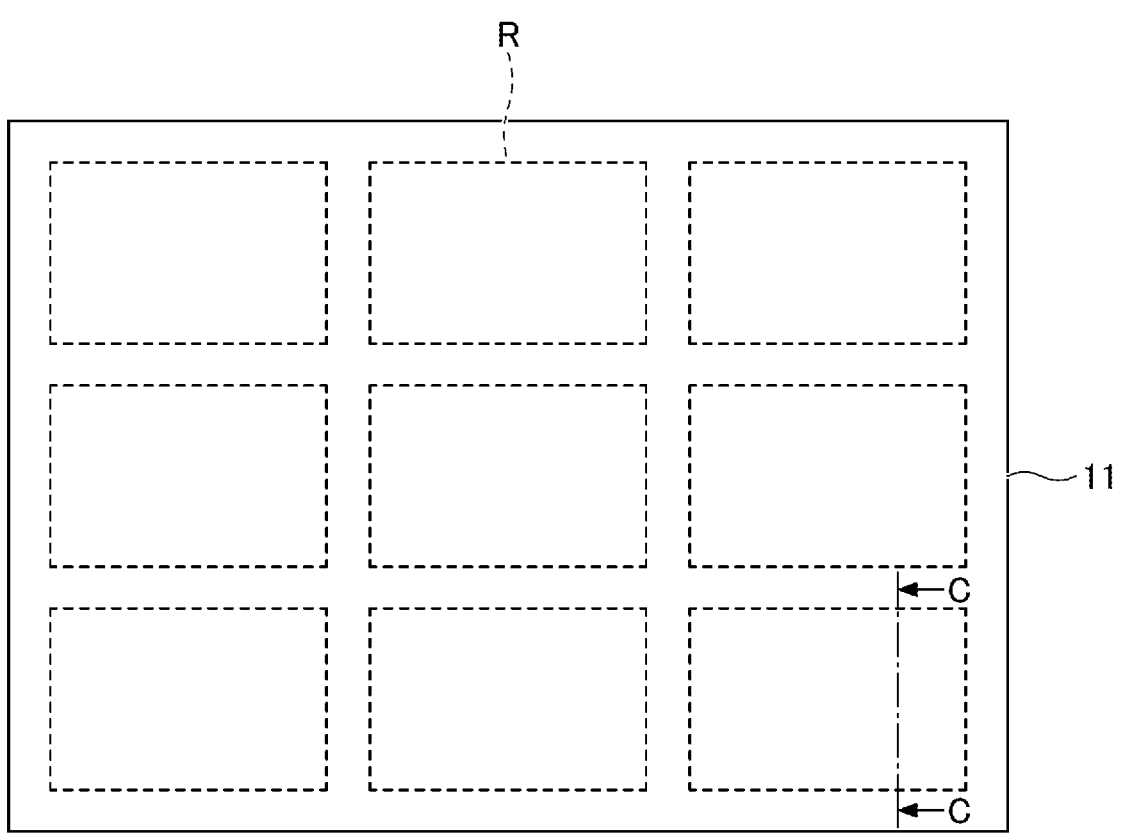
FIG. 3 is a drawing illustrating an example of a manufacturing process of the optical waveguide device according to the first embodiment.

In the method of making the optical waveguide device according to the first embodiment, a support 11 is first prepared as illustrated in FIG. 3. The support 11 is, for example, a large substrate for providing multiple devices for which a plurality of product regions R are defined, and will be cut along the outer perimeter of the product regions R to obtain individual optical waveguide devices. The support 11 is formed of, for example, an insulating resin material such as glass epoxy resin. The support 11 may be a rigid substrate with strong rigidity or a flexible substrate with weak rigidity.

Figure 4A:
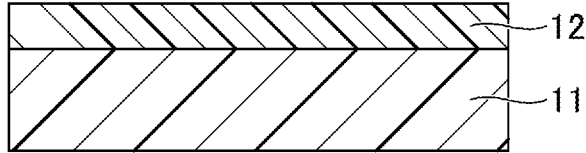
FIGS. 4A 4C through are drawings illustrating the example of the manufacturing process of the optical waveguide device according to the first embodiment.
Figure 4B:
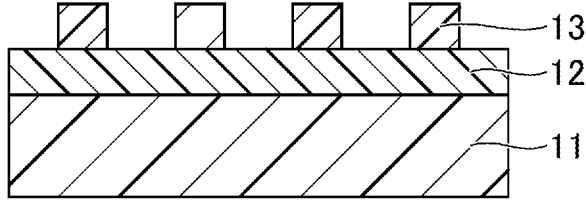
Figure 4C:
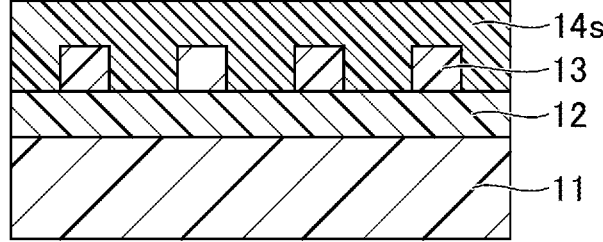

FIGS. 4A through 4C illustrate a cross section taken along the line C-C in FIG. 3. In the step illustrated in FIG. 4A, a first cladding layer 12 is formed on the support 11. The first cladding layer 12 is made by irradiating a photosensitive resin with ultraviolet light and then curing the photosensitive resin by heat treatment at a temperature of 150° C. to 200° C.

The first cladding layer 12 is formed on the entire surface of the support 11 in which the plurality of product regions R illustrated in FIG. 3 are defined. When there is a need to adjust the outer shape of the first cladding layer 12 by patterning, the photosensitive resin is irradiated with ultraviolet light through a photomask and developed to produce the first cladding layer 12.

The method of forming the photosensitive resin may include attaching a resin sheet or applying a liquid resin. The thickness of the first cladding layer 12 is, for example, about 10 μm to 30 μm.

In the step illustrated in FIG. 4B, strips of a core layer 13 arranged side by side are formed on the first cladding layer 12. Specifically, a photosensitive resin for creating the core layer 13 is disposed on the first cladding layer 12, and the photosensitive resin is irradiated with ultraviolet light through a photomask and developed, followed by curing the photosensitive resin by heat treatment at a temperature of about 150° C. to 200° C.

With this arrangement, the strips of the core layer 13 each having a band shape are arranged side by side on the first cladding layer 12. The width of each strip of the core layer 13 is set to, for example, 5 μm to 10 μm, and the thickness of the core layer 13 is set to, for example, 5 μm to 10 μm. In this embodiment, each strip of the core layer 13 has a small cross-sectional area in order to provide a single-mode optical waveguide.

The strips of the core layer 13 extend laterally through the product regions R in above-noted FIG. 3 such as to go across gaps between the product regions R.

In the step illustrated in FIG. 4C, a photosensitive resin 14s for creating a second cladding layer 14 is disposed on the first cladding layer 12 and the core layer 13. The photosensitive resin 14s is structured to have a flat upper surface while covering the upper surfaces and the side surfaces of the core layer 13.

As the photosensitive resin 14s, for example, a negative photosensitive epoxy resin or polyimide resin may be used. Substantially the same photosensitive resin is used for the first cladding layer 12 and the core layer 13 previously described.

The photosensitive resin 14s contains a reactive functional group contributing to photocuring and a reactive functional group contributing to thermosetting, and is cured by photocuring and thermosetting.

Figure 5:
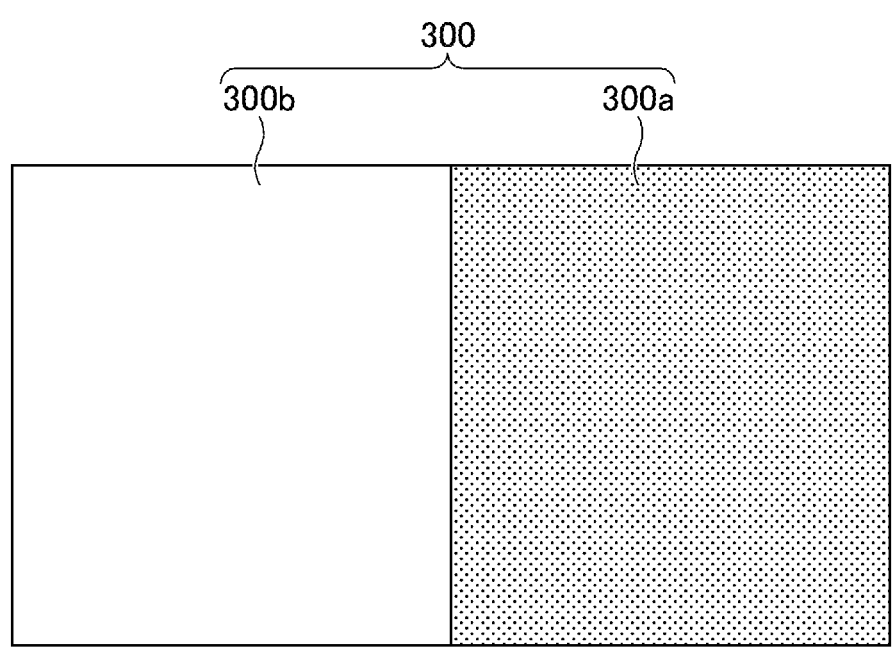
FIG. 5 is a drawing illustrating the example of the manufacturing process of the optical waveguide device according to the first embodiment.
Figure 5:
Figure 5:
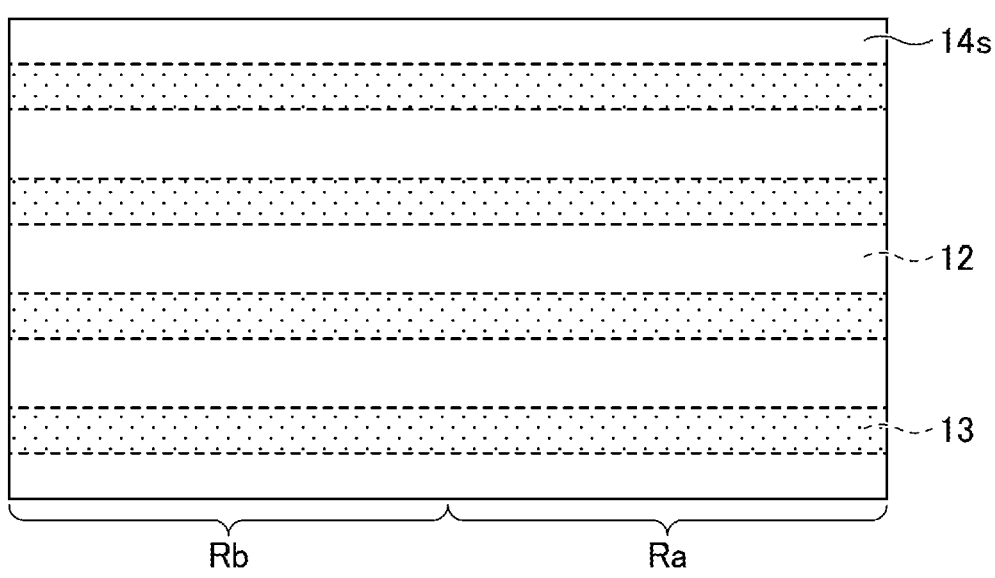

In a next step as illustrated in FIG. 5, a photomask 300 is prepared and placed on the photosensitive resin 14s. FIG. 5 is a partial view illustrating a portion of the photomask 300 corresponding to one product region R in FIG. 3 previously described. The photomask 300 includes a light shielding part 300a and a light transmitting part 300b.

The light shielding part 300a of the photomask 300 is positioned to align with the first region Ra of each product region R of FIG. 3, and is used to cause the photosensitive resin 14s arranged in the first region Ra to become an uncured part without being exposed.

The light transmitting part 300b of the photomask 300 is positioned to align with the second region Rb of each product region R of FIG. 3, and is used to cause photosensitive resin 14s arranged in the second region Rb to form a cured portion upon being exposed.

Figure 6A:
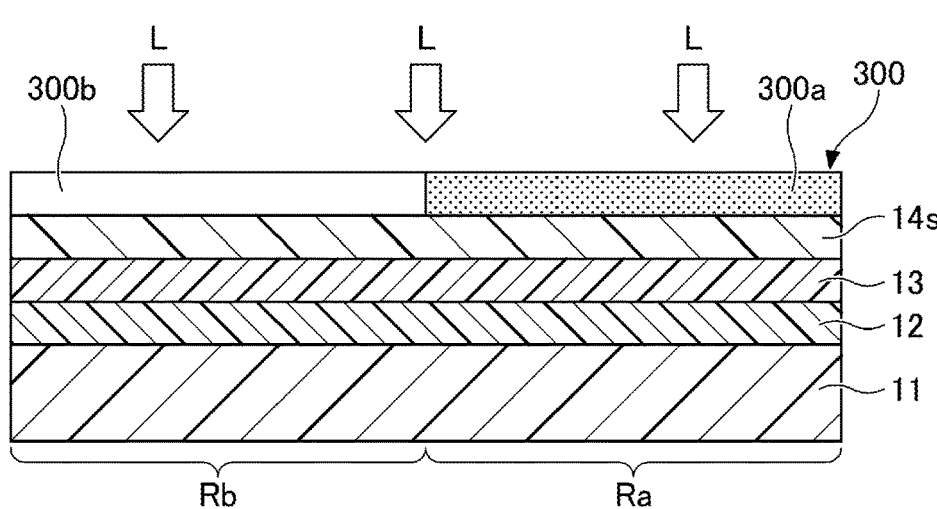
FIGS. 6A through 6C are drawings illustrating the example of the manufacturing process of the optical waveguide device according to the first embodiment.
Figure 6B:
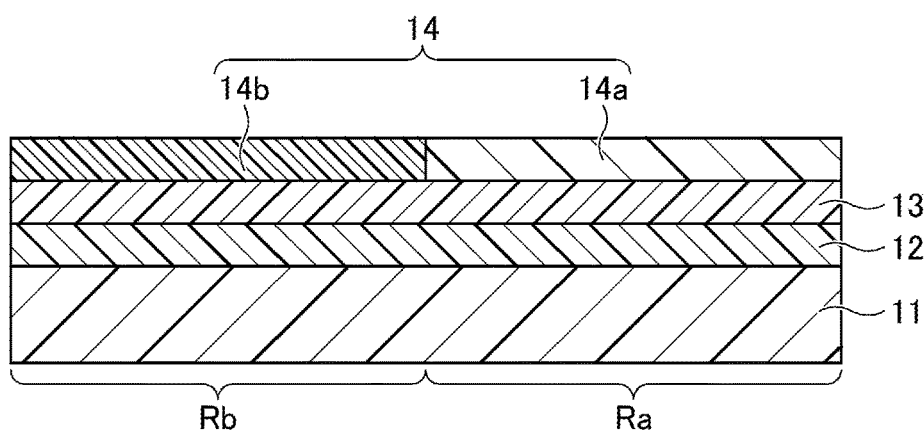

In the steps illustrated in FIGS. 6A and 6B, ultraviolet light L is directed onto the photosensitive resin 14s through the photomask 300 to partially cure the photosensitive resin 14s. In FIG. 6A, the photosensitive resin 14s in the second region Rb of each product region R is exposed to the ultraviolet light L through the light transmitting part 300b of the photomask 300, which results in the photosensitive resin 14s in the second region Rb of each product region R being cured. While this happens, the photosensitive resin 14s in the first region Ra of each product region R is shielded from light by the light shielding part 300a of the photomask 300, and is thus left in an uncured state without being exposed.

At this point, the exposed photosensitive resin 14s is not treated with a developer, and the unexposed portion of the photosensitive resin 14s in the first region Ra of each product region R is left as the uncured portion.

Subsequently, a heat treatment (post-bake) is performed at a temperature of 150° C. to 200° C. As a result, the second cladding layer 14 is formed on the first cladding layer 12 and the core layer 13. The thickness of the second cladding layer 14 is, for example, about 10 μm to 30 μm.

The photomask 300 is then removed. As illustrated in FIG. 6B, the uncured portion 14a of the second cladding layer 14 is disposed in the first region Ra of each product region R. Further, the cured portion 14b of the second cladding layer 14 is arranged in the second region Rb of each product region R.

The cured portion 14b of the second cladding layer 14 is obtained by completely curing the photosensitive resin 14s by light curing and heat curing. The uncured portion 14a of the second cladding layer 14 is formed of the photosensitive resin 14s that has undergone only heat treatment at a temperature of 150° C. to 200° C. without being exposed, and is thus maintained in an uncured state. The uncured portion 14a and the cured portion 14b of the second cladding layer 14 are continuous with each other.

In this manner, the optical waveguide is structured with the first cladding layer 12, the core layer 13 formed on the first cladding layer 12, and the second cladding layer 14 formed on the first cladding layer 12 and the core layer 13. The refractive index of the core layer 13 is set to be higher than the refractive indexes of the first cladding layer 12 and the second cladding layer 14.

In the present embodiment, the uncured portion 14a and the cured portion 14b of the second cladding layer 14 are formed of the photosensitive resin 14s which is a negative photosensitive resin.

Alternatively, the uncured portion 14a and the cured portion 14b of the second cladding layer 14 may be formed of a positive photosensitive resin.

In the case of a negative type, an exposed portion irradiated with light changes from soluble to insoluble by a crosslinking reaction, and an unexposed portion (uncured portion) is removed by a developer, leaving the exposed portion as a cured portion.

In contrast, in the case of a positive type, an exposed portion (uncured portion) irradiated with light changes chemically from alkali insoluble to soluble, and is removed by a developer, leaving an unexposed portion as a cured portion.

When the positive photosensitive resin is used, a positive photomask is used, which is made by inverting the black and white of the negative photomask illustrated in FIG. 5. A positive photosensitive resin is exposed through the positive photomask.

With such an arrangement, the exposed portion of the positive photosensitive resin becomes the uncured portion 14a of the second cladding layer 14 that is dissolved by a developer. The unexposed portion of the positive photosensitive resin is thermally cured to become the cured portion 14b of the second cladding layer 14.

As described above, the second cladding layer 14 may be formed of a negative photosensitive resin (i.e., photosensitive resin 14s) or a positive photosensitive resin. The uncured portion 14a of the second cladding layer 14 has a property of being dissolvable in a negative or positive developer to be removed. On the other hand, the cured portion 14b of the second cladding layer 14 has a property of being not dissolvable in a negative or positive developer.

Along the outer perimeter of each product region R, the second cladding layer 14, the core layer 13, the first cladding layer 12, and the support 11 are cut by a rotary blade or the like of a cutting device to form individual pieces. As a result, the end faces of the second cladding layer 14, the core layer 13, the first cladding layer 12, and the support 11 in a direction of extension of the strips of the core layer 13 are formed of cut faces, and are flush with each other.

Figure 6C:
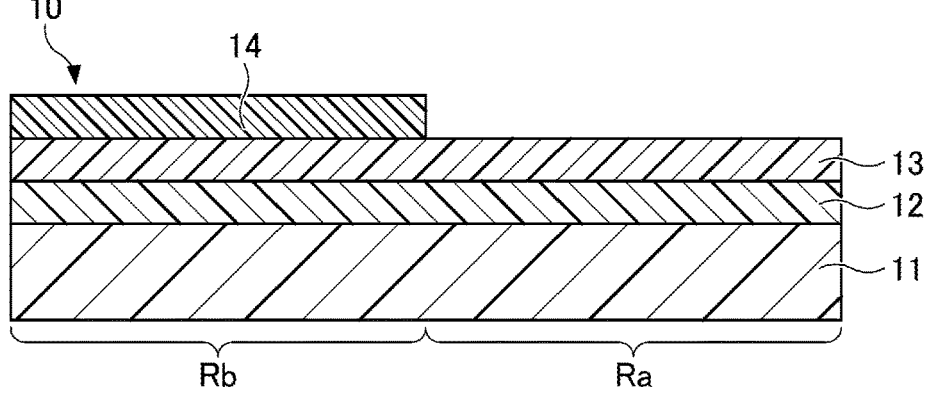

Subsequently, as illustrated in FIG. 6C, by treating the second cladding layer 14 with a developer, the uncured portion 14a of the second cladding layer 14 is removed, and the core layer 13 is exposed from the second cladding layer 14. This completes the optical waveguide substrate 10 in its final form.

When the second cladding layer 14 is formed of a negative photosensitive resin, the uncured portion 14a of the second cladding layer 14 may be dissolved by a negative developer for removal. When the second cladding layer 14 is formed of a positive photosensitive resin, the uncured portion 14a of the second cladding layer 14 may be dissolved by a positive developer for removal.

Figure 7:
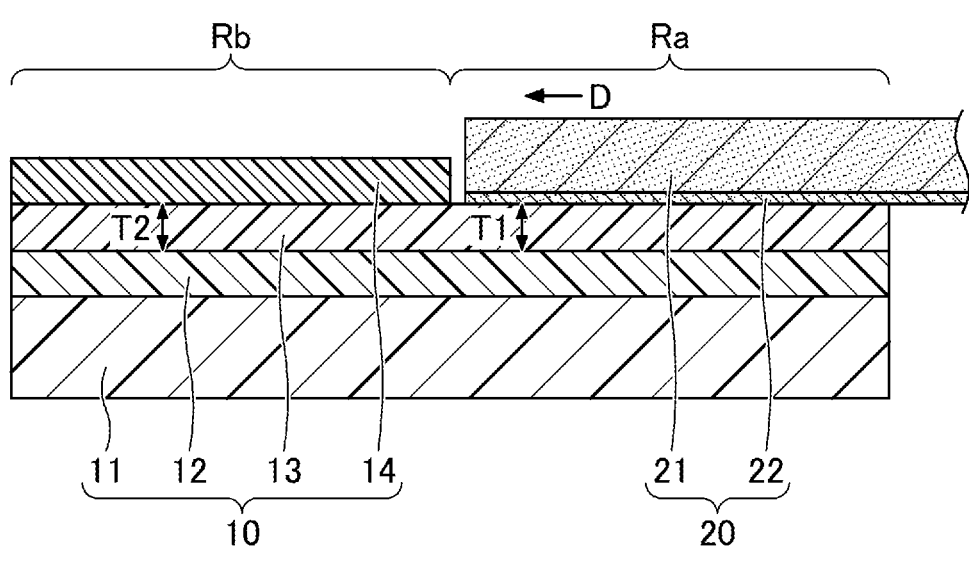
FIG. 7 is a drawing illustrating the example of the manufacturing process of the optical waveguide device according to the first embodiment.
Figure 7:
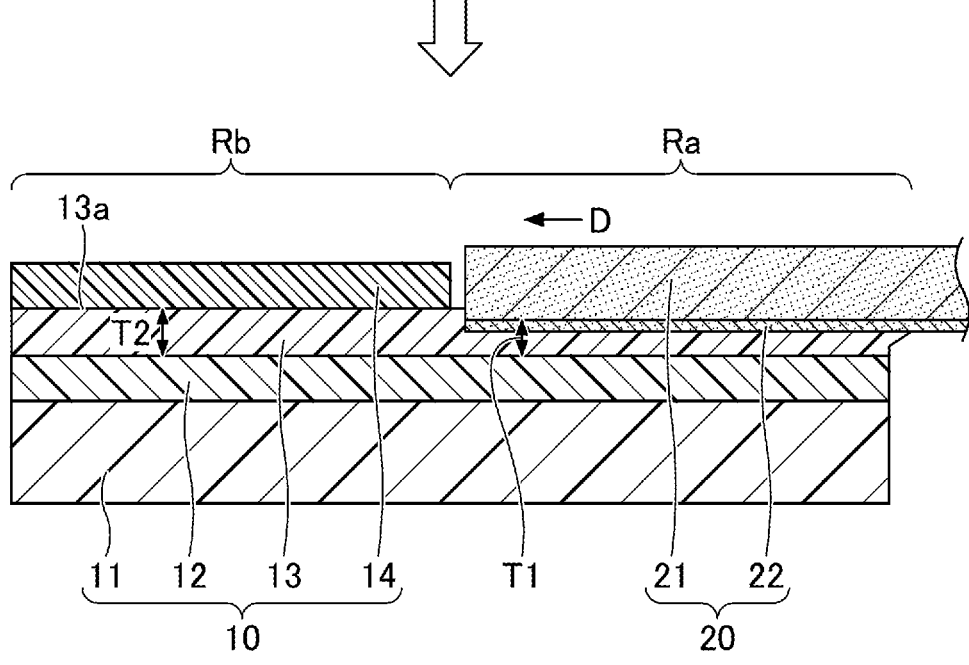
Figure 8:
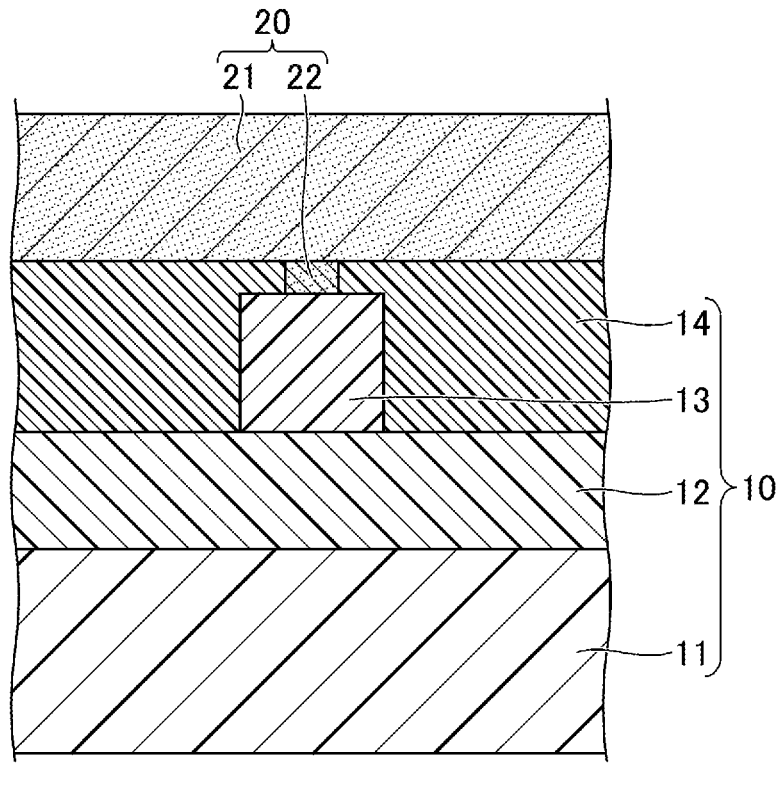
FIG. 8 is a drawing illustrating the example of the manufacturing process of the optical waveguide device according to the first embodiment.
Figure 8:
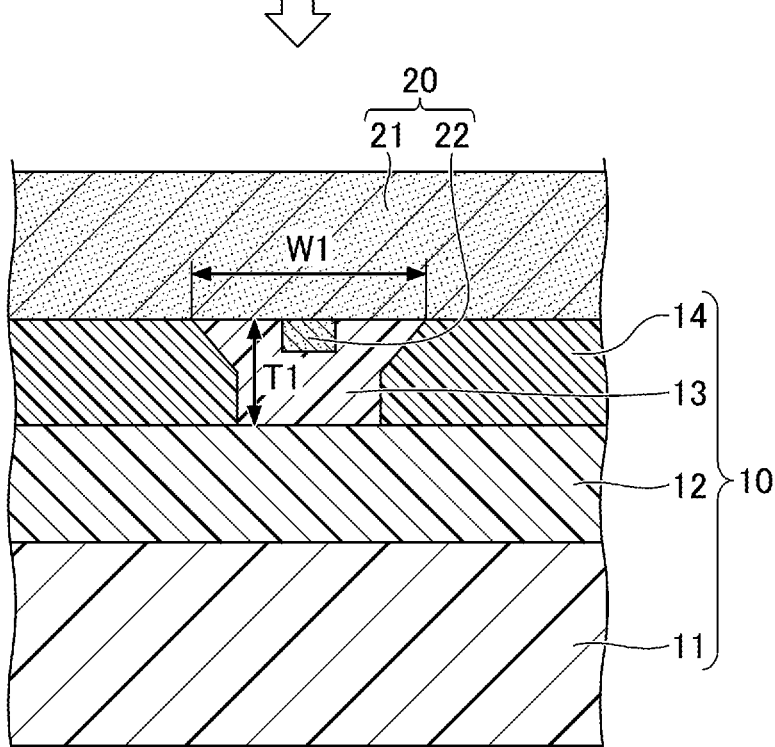

In the step illustrated in FIG. 7 and FIG. 8, a silicon photonic chip 20 is prepared, and silicon waveguides 22 are optically coupled with the core layer 13 exposed from the second cladding layer 14. As illustrated above the arrow in FIG. 7 and FIG. 8, the silicon photonic chip 20 is disposed on the optical waveguide substrate 10 such that one end of the silicon waveguides 22 extending in the optical waveguide direction D is in contact with the core layer 13. The silicon waveguides 22 may be aligned with the core layer 13 preferably by utilizing an alignment method that involves the alignment mark used for mounting a semiconductor chip. In this step, the thickness T1 of the core layer 13 in the place where the silicon substrate 21 is situated in plan view is the same as the thickness T2 of the core layer 13 in the place where the silicon substrate 21 is not situated in plan view. In a direction perpendicular to the optical waveguide direction D, the first width W1 of a strip of the core layer 13 at the point of contact with the silicon substrate 21 is the same as the second width W2 of the strip of the core layer 13 in the place covered with the second cladding layer 14 (see FIG. 1).

Thereafter, as illustrated below the arrow in FIG. 7 and FIG. 8, the silicon substrate 21 is pressed toward the first cladding layer 12, and part or all of the thickness of one end of the silicon waveguides 22 in the optical waveguide direction D is embedded in the core layer 13. In this step, the silicon substrate 21 is pressed toward the first cladding layer 12 preferably while heating the core layer 13. Further, in this step, the entire thickness of the one end of the silicon waveguides 22 extending in the optical waveguide direction D is preferably embedded in the core layer 13 exposed from the second cladding layer 14.

As a result of the above-noted step, the thickness T1 of the core layer 13 in the place where the silicon substrate 21 is situated in plan view becomes thinner than the thickness T2 of the core layer 13 in the place where the silicon substrate 21 is not situated in plan view. In a direction perpendicular to the optical waveguide direction D, the first width W1 of the core layer 13 at the point of contact with the silicon substrate 21 becomes wider than the second width W2 of the strip of the core layer 13 in the place covered with the second cladding layer 14 (see FIG. 1). In the above-noted step, the silicon substrate 21 is preferably pressed toward the first cladding layer 12 such that the first maximum width W1 is 1.05 to 1.2 times the second maximum width W2. This completes the optical waveguide device 1 in its final form.

In this step, the first maximum width W1 becomes wider than the second maximum width W2, which ensures that the silicon waveguides 22 be embedded in the widened strips of the core layer 13 even when a slight misalignment occurs between the silicon waveguides 22 and the strips of the core layer 13 in the direction perpendicular to the optical waveguide direction D. This arrangement enables the provision of the optical waveguide device 1 having excellent effective positional accuracy between the silicon waveguides 22 and the core layer 13. This arrangement also serves to increase the contact area between the core layer 13 and the silicon photonic chip 20, thereby improving the adhesion between the core layer 13 and the silicon photonic chip 20.

<Variation>

This variation is directed to an example of an optical waveguide device in which the cross-sectional shape of strip of the core layer in the place where the silicon substrate is situated in plan view is modified. In the variation, descriptions of the same elements as those of the previously described embodiment may be omitted.

Figure 9A:
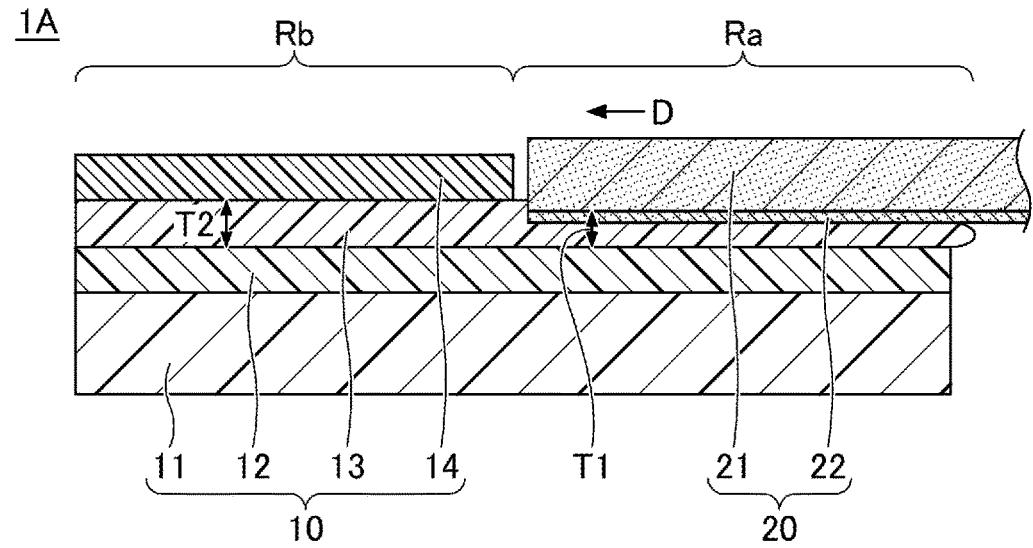
FIGS. 9A and 9B are drawings illustrating an example of an optical waveguide device according to a variation.
Figure 9B:
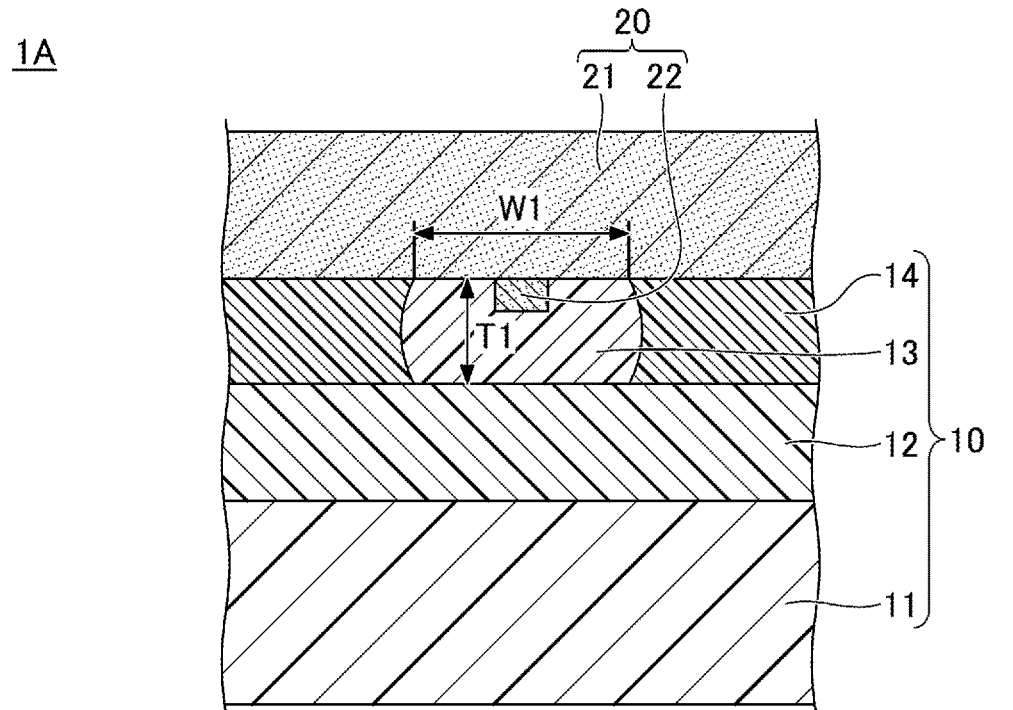

FIGS. 9A and 9B are cross-sectional views illustrating an example of an optical waveguide device according to the variation. FIG. 9A illustrates a cross-section corresponding to FIG. 2A, and FIG. 9B illustrates a cross-section corresponding to FIG. 2B. The plan view of the optical waveguide device according to the variation is the same as that of FIG. 1.

An optical waveguide device 1A is configured such that the shape of each strip of the core layer 13 is substantially elliptical in a cross-section perpendicular to the optical waveguide direction D illustrated in FIG. 9B. Like the optical waveguide device 1, the optical waveguide device 1A is structured such that the thickness T1 of the core layer 13 in the place where the silicon substrate 21 is situated in plan view is thinner than the thickness T2 of the core layer 13 in the place where the silicon substrate 21 is not situated in plan view. Like the optical waveguide device 1, the optical waveguide device 1A is such that the first width W1 of a strip of the core layer 13 at the point of contact with the silicon substrate 21 in a direction perpendicular to the optical waveguide direction D is wider than the second width W2 of the strip of the core layer 13 in the place covered with the second cladding layer 14 (see FIG. 1).

Accordingly, similarly to the optical waveguide device 1, the optical waveguide device 1A allows required positioning accuracy to be less stringent between the silicon waveguides 22 and the core layer 13 in a direction perpendicular to the optical waveguide direction D, and allows the silicon waveguides 22 to be easily embedded in the core layer 13. This arrangement enables the provision of the optical waveguide device 1A having excellent effective positioning accuracy between the silicon waveguides 22 and the core layer 13. This arrangement also serves to increase the contact area between the core layer 13 and the silicon photonic chip 20, thereby improving the adhesion between the core layer 13 and the silicon photonic chip 20.

According to the disclosed technology, it is possible to provide an optical waveguide device having excellent positional accuracy between a silicon waveguide and a core layer.

The present disclosures non-exclusively include the subject matter set out in the following clauses.

Clause 1. A method of making an optical waveguide device comprising:

providing an optical waveguide substrate including a support, a first cladding layer disposed on the support, a core layer disposed on the first cladding layer, and a second cladding layer selectively covering the core layer;

providing a silicon photonic chip including a silicon substrate and a silicon waveguide disposed on one side of the silicon substrate; and optically coupling the silicon waveguide with the core layer exposed from the second cladding layer;

wherein the optically coupling the silicon waveguide includes;

placing the silicon photonic chip on the optical waveguide substrate such that one end of the silicon waveguide in an optical waveguide direction is in contact with the core layer; and pressing the silicon substrate toward the first cladding layer to cause part or all of a thickness of the one end to be embedded in the core layer, wherein as a result of the pressing the silicon substrate, a thickness of the core layer in a place covered with the silicon substrate in plan view becomes less than a thickness of the core layer in a place not covered with the silicon substrate in the plan view, and a first width of the core layer at a point of contact with the silicon substrate as measured in a direction perpendicular to the optical waveguide direction becomes wider than a second width of the core layer in a place covered with the second cladding layer.

Clause 2. The method of making an optical waveguide device as recited in Clause 1, wherein the pressing the silicon substrate presses the silicon substrate toward the first cladding layer while heating the core layer.

Clause 3. The method of making an optical waveguide device as recited in Clause 1, wherein the pressing the silicon substrate presses the silicon substrate toward the first cladding layer such that the first width is 1.05 times or more and 1.2 times or less than the second width.

Clause 4. The method of making an optical waveguide device as claimed in Clause 1, wherein the providing the optical waveguide substrate includes:

disposing a material to become the second cladding layer on an entire upper surface of the core layer;

leaving the material uncured in a first region of the core layer while curing the material in a second region of the core layer; and dissolving material in a developer to remove the uncured material, wherein the optically coupling the silicon waveguide optically couples the silicon waveguide with the core layer in the first region.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical waveguide device comprising:

an optical waveguide substrate including a support, a first cladding layer disposed on the support, a core layer disposed on the first cladding layer, and a second cladding layer selectively covering the core layer; and a silicon photonic chip including a silicon substrate and a silicon waveguide disposed on one side of the silicon substrate, wherein part or all of a thickness of one end of the silicon waveguide in an optical waveguide direction is embedded in the core layer exposed from the second cladding layer, and is optically coupled with the core layer, wherein a thickness of the core layer in a place covered with the silicon substrate in plan view is less than a thickness of the core layer in a place not covered with the silicon substrate in the plan view, and wherein in a direction perpendicular to the optical waveguide direction, a first width of the core layer at a point of contact with the silicon substrate is wider than a second width of the core layer in a place covered with the second cladding layer.

2. The optical waveguide device as claimed in claim 1, wherein an entire thickness of the one end in the optical waveguide direction is embedded in the core layer exposed from the second cladding layer.

3. The optical waveguide device as claimed in claim 1, wherein the first width is 1.05 times or more and 1.2 times or less than the second width.

4. The optical waveguide device as claimed in claim 1, wherein the core layer in the place covered with the silicon substrate in the plan view has a portion whose width, as measured in the direction perpendicular to the optical waveguide direction, gradually increases with a distance from the support toward the silicon substrate.

5. The optical waveguide device as claimed in claim 1, wherein a width of the core layer in the place covered with the silicon substrate in the plan view, as measured in the direction perpendicular to the optical waveguide direction, is maximum at a point closest to the silicon substrate.

6. The optical waveguide device as claimed in claim 1, wherein an end of the core layer situated in the place covered with the silicon substrate protrudes in the optical waveguide direction in a longitudinal cross-section taken in the optical waveguide direction, such that a portion at a point of contact with the silicon waveguide protrudes relative to a portion at a point of contact with the first cladding layer.

* * * * *